United States Patent [19]

Shibuta et al.

[11] 4,446,295

[45] May 1, 1984

[54] THERMISTOR USING ORGANOPHOSPHAZENE POLYMER

[75] Inventors: Osamu Shibuta; Masayoshi Suzue, both of Tokushima; Tetuo Hasegawa, Naruto, all of Japan

[73] Assignee: Otsuka Chemical Co., Ltd., Osaka, Japan

[21] Appl. No.: 288,030

[22] Filed: Jul. 29, 1981

[30] Foreign Application Priority Data

Sep. 13, 1980 [JP] Japan ................................ 55-127626

[51] Int. Cl.$^3$ ..................... H01C 7/10; H01C 7/13; C08G 73/00; C08G 83/00
[52] U.S. Cl. .................................... 528/168; 252/511; 528/399; 528/400; 338/22 R; 338/22 SD; 338/23
[58] Field of Search ............... 338/22 R, 23; 528/168, 528/399; 252/511

[56] References Cited

U.S. PATENT DOCUMENTS

| | | | |
|---|---|---|---|
| 3,766,511 | 10/1973 | De Vries et al. | 338/22 |
| 3,945,966 | 3/1976 | Vicic et al. | 528/399 |
| 4,120,838 | 10/1978 | Vicic et al. | 524/436 |
| 4,177,446 | 12/1979 | Diaz | 338/22 R |
| 4,304,987 | 12/1981 | Konynenburg | 338/22 R |

OTHER PUBLICATIONS

Chem. Abst., vol. 80, 121796z (1974).
Chem. Abst., vol. 82-19764h (1975).
Chem. Abst., vol. 92-103160f (1980).

*Primary Examiner*—Wilbert J. Briggs, Sr.
*Attorney, Agent, or Firm*—Armstrong, Nikaido, Marmelstein & Kubovcik

[57] ABSTRACT

A thermistor using an organophosphazene polymer having aryloxyl and/or alkoxyl group pendants as a thermo-responsive material. The organophosphazene polymer has an excellent responsiveness to temperature change, and can be molded into desired forms. The thermistor having good reliability and good heat and flame resistances can be prepared with good processability and in good yield.

1 Claim, 5 Drawing Figures

THERMISTOR USING ORGANOPHOSPHAZENE POLYMER

BACKGROUND OF THE INVENTION

The present invention relates to a novel thermistor, and more particularly to a sensor using an organophosphazene polymer as a thermo-responsive material.

It may safely be said that almost all of semiconductors which have brought about a revolution in the field of electronics are semiconductors made of inorganic materials, including metals and metal oxides, and such ceramic semiconductors have been employed for a variety of purposes. Thermo-sensors presently used are chiefly those using ceramic semiconductors as temperature-detecting materials.

However, such ceramic thermistors have the defect that the yield is not good, since the ceramic semiconductors are sintered bodies of metals or metal oxides and accordingly it is difficult to prepare the thermistors having the same efficiency at all times. This defect has been gradually overcome with increase of uses of ceramic semiconductors, but is not still satisfactory.

On the other hand, a high efficiency has been required for thermo-sensors with development of electronic industry. Ceramic thermistors leave a room for improvement in that thermo-sensor elements of desired shapes are hard to be obtained due to sintered bodies and the application apt to be limited to points, that ceramic thermistors have the limit, due to their property, in making them light weight which is required in electronic industry aiming at lightening and miniaturization, and that the thermistor constant is at most 5,000 K. and accordingly the sensitivity is not satisfactory as well as the reliability in use for a long term and molding processability.

In view of these points, new materials adoptable as thermo-sensors are pursued. It has been attempted to utilize plastics as thermistor materials in place of ceramics, and there are proposed a process in which a semiconductive material is incorporated in usual plastics and the blend is formed into a desired shape, and a process in which a charge-transfer complex is made into a high polymer. The former has the disadvantages that the incorporation of ceramics or analogous materials into plastics accompanies technical difficulty and the efficiency as thermistors of the product is far inferior to that of ceramic thermistors. On the other hand, the latter has a problem in durability of the product. Also, plastic thermistors have the defect that heat resistance and flame resistance are poor. Further, in recent years, an intense study of organic semiconductors such as polyacetylene has been made, but does not go beyond the fundamental study.

It is an object of the present invention to provide a novel thermistor which has no defects as mentioned above.

A further object of the present invention is to provide a thermistor which is good in molding processability, yield of product and reliability.

These and other objects of the present invention will become apparent from the description hereinafter.

SUMMARY OF THE INVENTION

It has now been found that a certain kind of organophosphazene polymers which may be referred to as semi-inorganic plastics, are responsive to temperature change and is very suitable for use in thermo-sensors for detecting temperature.

In accordance with the present invention, there is provided a thermistor which comprises an organophosphazene polymer of the following general formula:

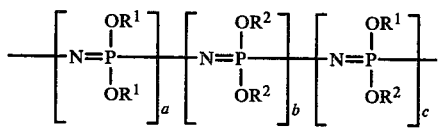

wherein $R^1$ and $R^2$ are the same or different and each is phenyl group, a halogenated aryl group, an alkylaryl group whose alkyl group has 1 to 12 carbon atoms, or a fluoroalkyl group having 1 to 12 carbon atoms, and a, b and c are 0 or a positive integer within the range of $15 \leq a+b+c \leq 15,000$, and respective recurring units are randomly distributed.

The organophosphazene polymer can be readily prepared on industrial scale and can be readily molded into a desired form and, therefore, provide a thermistor having a good reliability and a wide range of applications with good processability and in good yield. The thermistor of the present invention is a thermo-sensor utilizing the change of electric resistance. A sensor of which the electric resistance changes more sharply against temperature change, the better the responsiveness of the sensor.

DETAILED DESCRIPTION

Figure 1:
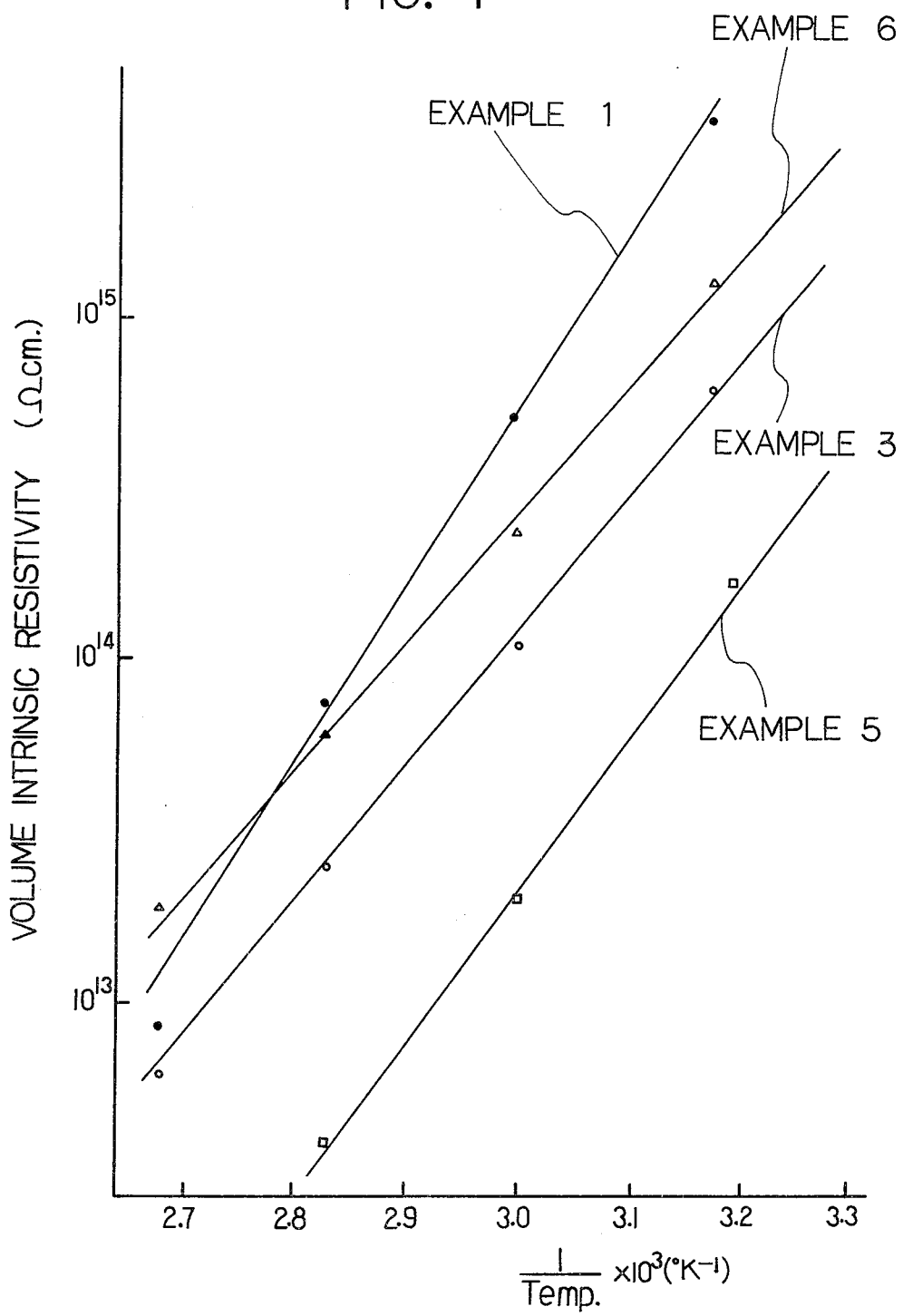
FIGS. 1 and 2 are graphs showing the electric resistance-temperature characteristic of an organophosphazene polymer of the present invention.

The organophosphazene polymers useful as a thermo-responsive material are those having the following general formula (I):

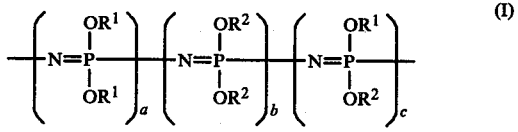

wherein $R^1$ and $R^2$ are the same or different and each is phenyl group, a halogenated aryl group, an alkylaryl group whose alkyl group has 1 to 12 carbon atoms, or a fluoroalkyl group having 1 to 12 carbon atoms, and a, b and c are 0 or a positive integer within the range of $15 \leq a+b+c \leq 15,000$, and respective recurring units are randomly distributed.

The organophosphazene polymers (I) are prepared in a known manner as disclosed in H. R. Allcock, Inorganic Chemistry, Vol. 5, No. 10, 1709 (1966), by ring-opening polymerization of hexachlorotriphosphonitrile, i.e. the (PNCl$_2$)$_3$ trimer and subsequent alkoxylation of the resulting dichlorophosphazene polymer according to the following reaction scheme:

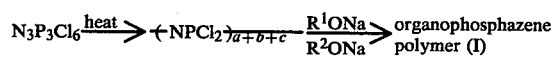

wherein $R^1$, $R^2$, a, b and c are as defined above. The dichlorophosphazene polymer is first prepared in a usual manner, for instance, by charging $(PNCl_2)_3$ trimer purified by sublimation, recrystallization or distillation to a polymerization vessel, repeating melting-solidification-degassing procedure 2 or 3 times, reducing the pressure and sealing the vessel, polymerizing at an elevated temperature, e.g. 255° C., for 20 to 100 hours, dissolving the reaction mixture in a good solvent for the polymer and the trimer such as benzene, toluene or xylene, and pouring the solution to a poor solvent for the polymer such as petroleum ether, hexane or heptane to reprecipitate the polymer. The dichlorophosphazene polymer is dissolved in an organic solvent used as an alkoxylation reaction medium such as benzene, toluene, xylene or tetrahydrofuran. On the other hand, an alkoxide solution is prepared by reaction of metal sodium and an alcohol in an organic solvent such as benzene, toluene, xylene or tetrahydrofuran. By employing the thus prepared polymer solution and alkoxide solution, the reaction is carried out at a temperature of 20° to 110° C. for 20 to 100 hours to produce the organophosphazene polymer. In the reaction, one or more alkoxides may be employed.

Figure 2:
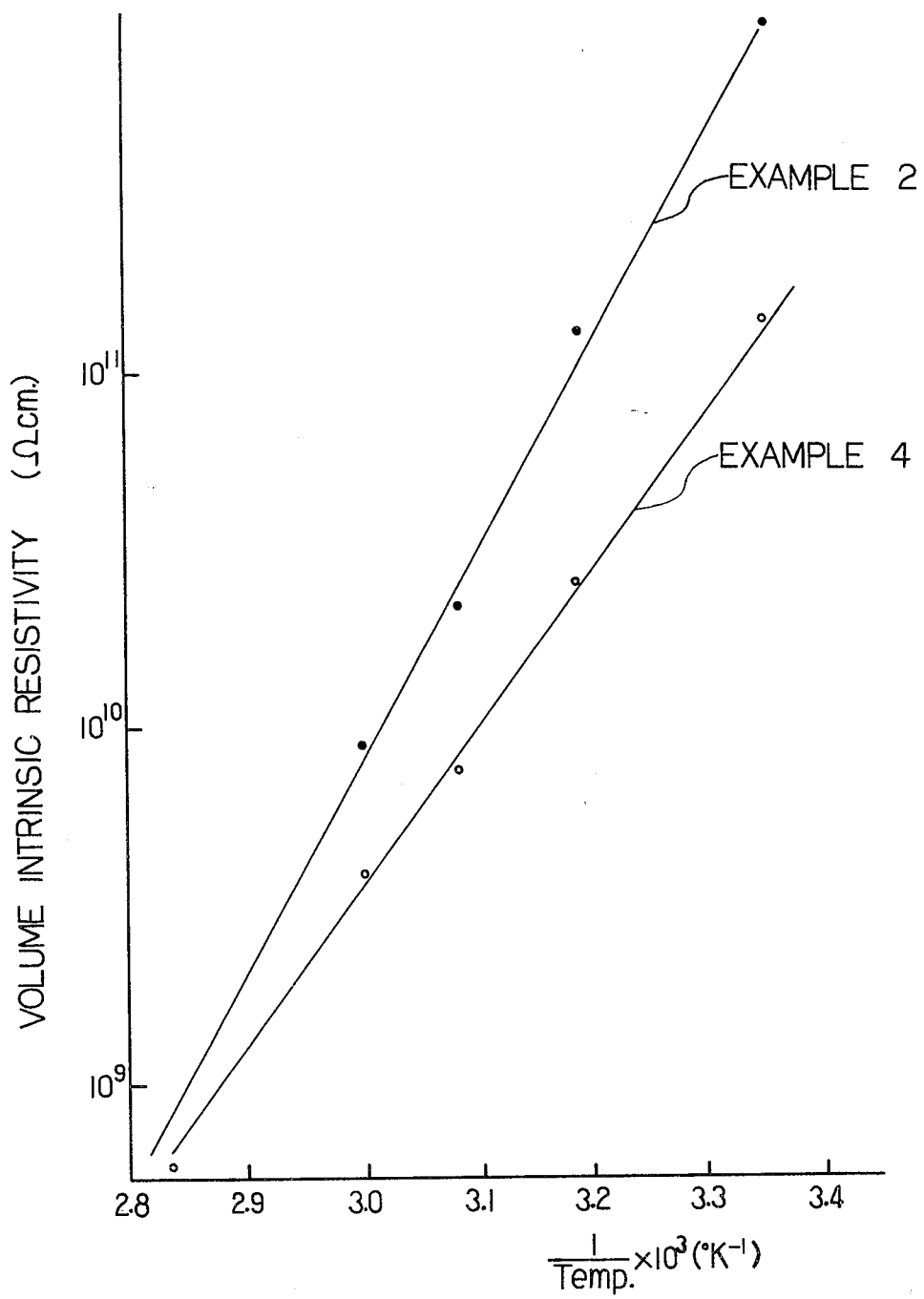

The organophosphazene polymer (I) can sufficiently exhibit the function as a thermistor, even if the recurring units are randomly distributed. The resistivity as a sensor varies depending on the kinds of the groups $R^1$ and $R^2$ of the polymer, as shown in FIGS. 1 and 2. Dichlorophosphazene polymers having no organic pendants $R^1$ and $R^2$ have little characteristic as a semiconductor, and are not usable as a thermo-responsive material of the sensor. In contrast to this, the organophosphazene polymer having aryloxyl and/or alkoxyl pendants in the present invention has a characteristic as a semiconductor. The $R^1$ and $R^2$ groups in the organophosphazene polymer (I) include, for instance, phenyl, halogenated aryl groups, e.g. halogenated phenyl groups such as p-chlorophenyl and p-bromophenyl, alkylaryl groups of which alkyl group has 1 to 12 carbon atoms, e.g. alkylphenyl groups such as methylphenyl and tertbutylphenyl, and fluoroalkyl groups such as trifluoroethyl, pentafluoropropyl and octafluoropentyl.

Typical examples of the organophosphazene polymers used in the present invention are, for instance, $[NP(OC_6H_2R'R''R''')_2]_n$ such as $[NP(OC_6H_5)_2]_n$ or $[NP(OC_6H_4CH_3)_2]_n$, $[NP(OC_6H_5)(OCH_2CF_3)]_n$, $[NP(OCH_2CF_3)_2]_n$, $[NP(OCH_2CF_3)(OCH_2CF_2CF_3)]_n$, $[NP(OC_6H_5)(OCH_2CF_2CF_3)]_n$, $[NP(OCH_2CF_2CF_3)_2]_n$, $[NP(OC_6H_4X)_2]_n$, $[NP(OC_6H_4X)(OCH_2CF_3)]_n$, and $[NP(OCH_2(CF_2CF_2)_mH)_2]_n$ wherein n=a+b+c, X is a halogen such as fluorine, chlorine or bromine, R', R'' and R''' are hydrogen atom or an alkyl group, and m is an integer of 1 to 4.

A process for preparing the organophosphazene polymer has been well industrially studied and, therefore, the reproducibility and reliability of thermistor is good and also the mass-production is possible.

The organophosphazene polymers in the present invention are plastic-like or rubber-like materials and are rich in flexibility and softness. The polymers can be molded by a usual molding process for plastics such as a casting or press molding process into various desired forms such as film and sheet. Although a conventional thermistor using a ceramic semiconductor has limited uses in respect of moldability due to ceramics, the organophosphazene polymers have a good moldability like thermoplastics as well as good heat resistance and flame resistance and, therefore, can provide a thermistor of which the range of application is widened from point to face. For instance, it is possible to apply the thermistor to bent or movable portions in which flexibility is required as well as heat resistance and flame resistance, e.g. electric blanket, floor heater and fire alarm to which the application has not been considered or has been difficult by the use of a conventional ceramic thermistor. The thermistors using organophosphazene polymers of the present invention have an increased various uses, and are plastic thermistor of new type.

The thermistors are prepared in a known manner, for instance, by providing organophosphazene polymer moldings of desired shape with electrodes and connecting lead wires to the electrodes.

Figure 3:
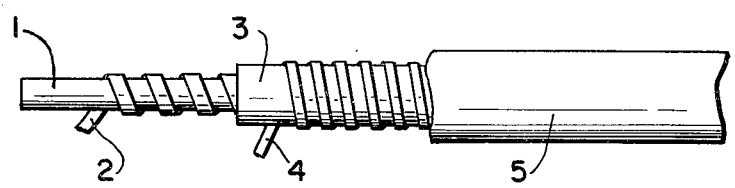
FIGS. 3, 4a, 4b, and 5 illustrate typical embodiments of thermo-sensors.
Figure 4A:
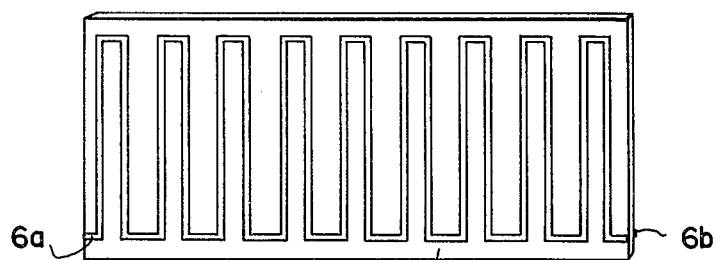
Figure 4B:
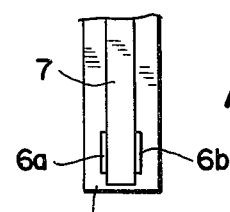
Figure 5:
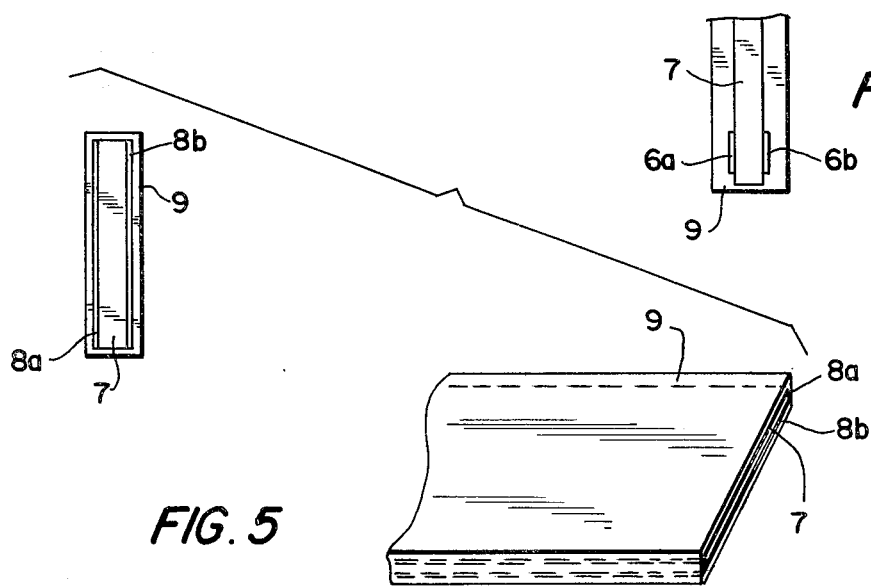

Typical thermo-sensors are shown in FIGS. 3, 4 and 5.

In FIG. 3, 1 is an insulating core, 2 is a heating wire, 3 is a plastic thermistor (a thermo-responsive material), e.g., an organo phosphazene polymer as defined in the claims, 4 is a detecting conductor, and 5 is an insulating cover. The heating wire 2 may be replaced with a detecting conductor, and in that case, a heating wire is provided separately. A circuit is constituted so that the amount of electric current passed through the heating wire 2 is controlled in accordance with change in impedance owing to temperature of the thermo-responsive material 3 positioned between the heating wire 2 and the detecting conductor 4.

In FIGS. 4a and 4b, 6a and 6b are detecting conductors (electrodes), 7 is a thermo-responsive material, and 9 is an insulating cover. The sensor detects heat from the outside with a face, and the amount of electric current passed through a device to which this sensor is applied, is controlled in accordance with change in impedance owing to temperature. The sensor of this type can be employed in a bent form.

In FIG. 5, 8a and 8b are electrodes, 7 is a thermo-responsive material, and 9 is an insulating cover. The sensor detects heat from the outside with a face, and the amount of electric current passed through a device to which this sensor is applied, is controlled in accordance with change an impedance owing to temperature.

The present invention is more specifically described and explained by means of the following Examples.

EXAMPLE 1

[Preparation of chlorophosphazene polymer]

A heat resisting glass tube was charged with 50 g. of hexachlorocyclotriphosphazene purified sufficiently by reduced pressure distillation and recrystallization from n-hexane, and after repeating melting-solidification-degassing procedures 3 times, the pressure in the tube was reduced to $1.5 \times 10^{-2}$ Torr and the tube was sealed. The polymerization was carried out at 255° C. for 30 hours. The polymerization tube was then broken, and the reaction mixture was dissolved in 300 ml. of toluene to recover. The toluene solution was poured into 1,500 ml. of petroleum ether to give 20.5 g. of a precipitate of white polymer. The conversion of the polymer was 41% by weight. The obtained white polymer was dissolved in 200 ml. of toluene to give a polymer solution.

[Preparation of alkoxide]

A one liter four-necked flask equipped with a thermometer, a stirrer and a reflux condenser was charged with 300 ml. of toluene and 43.3 g. of phenol, and 9.0 g. of cut pieces of sodium was added to the flask with stirring to produce sodium phenoxide. The reaction was conducted for 1 to 2 hours under reflux to give an alkoxide solution.

[Preparation of organophosphazene polymer]

The polymer solution was added to the alkoxide solution over 2 hours with stirring. The reaction was an exothermic reaction, and after the completion of the addition, the reaction mixture was further refluxed for 30 hours. After the completion of the reaction, the reaction mixture was neutralized with a concentrated hydrochloric acid. Toluene was then distilled away, and 300 ml. of tetrahydrofuran was added to the residue to give a liquid containing the polymer and sodium chloride. The liquid was poured into a large amount of water to desalt. After conducting the desalting 3 times, the tetrahydrofuran solution of the polymer was poured into a large amount of hexane to give 38.2 g. of $[NP(OC_6H_5)_2]_n$ polymer.

The yield of the organophosphazene polymer to the dichlorophosphazene polymer used was 93% by mole. The chlorine content of the organophosphazene polymer was not more than 0.2% by weight, and the intrinsic viscosity $[\eta]$ was 2.3 dl./g. in acetone at 30° C.

The electric resistance-temperature characteristic of the organophosphazene polymer is shown in FIG. 1. The thermistor constant was 10,000 K.

EXAMPLE 2

A one liter four-necked flask equipped with a thermometer, a stirrer and a reflux condenser was charged with 300 ml. of tetrahydrofuran and 45.5 g. of trifluoroethanol, and 9.0 g. of cut pieces of sodium was added to the flask with stirring to produce sodium trifluoroethoxide. The reaction was conducted for 1 to 2 hours under reflux to give an alkoxide solution.

A polymer solution was prepared in the same manner as in Example 1, and was added to the alkoxide solution over 2 hours. The reaction mixture was further refluxed for 30 hours. After the completion of the reaction, the reaction mixture was neutralized with conc. hydrochloric acid. Toluene and tetrahydrofuran were distilled away, and 300 ml. of acetone was added to the residue to give a liquid containing the polymer and sodium chloride. The liquid was poured into a large amount of water to desalt. After conducting the desalting 3 times, the acetone solution of the polymer was poured into a large amount of hexane to give 40.8 g. of white $[NP(OCH_2CF_3)_2]_n$ polymer. The yield was 95% by mole. The intrinsic viscosity of the polymer was 2.1 dl./g. in acetone at 30° C.

The electric resistance-temperature characteristic of the polymer is shown in FIG. 2. The thermistor constant was 14,000 K.

EXAMPLE 3

The procedure of Example 1 was repeated except that p-chlorophenol was employed instead of phenol to give sodium p-chlorophenoxide.

The obtained $[NP(OC_6H_4Cl)_2]_n$ polymer had an intrinsic viscosity of 2.5 dl./g. in toluene at 30° C.

The electric resistance-temperature characteristic of the polymer is shown in FIG. 1. The thermistor constant was 9,000 K.

EXAMPLE 4

The procedure of Example 2 was repeated except that octafluoropentanol was employed instead of trifluoroethanol to give sodium octafluoropentoxide.

The obtained $[NP(OCH_2C_4F_8H)_2]_n$ polymer had an intrinsic viscosity of 2.7 dl./g. in acetone at 30° C.

The electric resistance-temperature characteristic of the polymer is shown in FIG. 2. The thermistor constant was 8,000 K.

EXAMPLE 5

The procedure of Example 1 was repeated except that equimolar amounts of phenol and trifluoroethanol were employed to give an alkoxide solution containing equimolar amounts of sodium phenoxide and sodium trifluoroethoxide.

The obtained $[NP(OCH_2CF_3)(OC_6H_5)]_n$ polymer had an intrinsic viscosity of 2.3 dl./g. in tetrahydrofuran at 30° C.

The electric resistance-temperature characteristic of the polymer is shown in FIG. 1. The thermistor constant was 12,000 K.

EXAMPLE 6

The procedure of Example 1 was repeated except that 4-methylphenol was employed instead of phenol to give sodium 4-methylphenoxide.

The obtained $[NP(4-CH_3-C_6H_4O)_2]_n$ polymer had an intrinsic viscosity of 2.3 dl./g. in tetrahydrofuran at 30° C.

The electric resistance-temperature characteristic of the polymer is shown in FIG. 1. The thermistor constant was 11,000 K.

What we claim is:

1. A thermistor device comprising a body portion of a thermo-responsive material, said thermo-responsive material consisting essentially of an organophosphazene polymer of the following general formula:

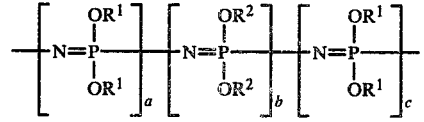

wherein $R^1$ and $R^2$ are the same or different and each is phenyl group, a halogenated aryl group, an alkylaryl group whose alkyl group has 1 to 12 carbon atoms, or a fluoroalkyl group having 1 to 12 carbon atoms, and a, b and c are 0 or a positive integer within the range of $15 \leq a+b+c \leq 15,000$, and respective recurring units are randomly distributed; and at least two spaced electrical conductors in electrical contact with said body portion.

* * * * *